United States Patent
Inoue (10) Patent No.: US 11,708,802 B2
(45) Date of Patent: Jul. 25, 2023

(54) FUEL MANAGEMENT SYSTEM CAPABLE OF IMPROVING ACCURACY OF CALIBRATION DATA FOR CONVERTING OUTPUT VALUE OF FUEL GAUGE INTO REMAINING AMOUNT OF FUEL IN FUEL TANK

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/857,202

(22) Filed: Jul. 5, 2022

(65) Prior Publication Data

US 2023/0020594 A1  Jan. 19, 2023

(30) Foreign Application Priority Data

Jul. 19, 2021 (JP) .................. 2021-118956

(51) Int. Cl.
*F02D 41/24* (2006.01)
*F02D 41/22* (2006.01)
*B63H 20/00* (2006.01)

(52) U.S. Cl.
CPC ......... *F02D 41/2432* (2013.01); *F02D 41/22* (2013.01); *F02D 41/2451* (2013.01); *B63H 20/00* (2013.01); *F02D 2041/224* (2013.01); *F02D 2200/0614* (2013.01); *F02D 2200/0625* (2013.01)

(58) Field of Classification Search
CPC ..... B63H 20/00; F02D 41/22; F02D 41/2432; F02D 41/2451; F02D 2041/224; F02D 2200/0614; F02D 2200/0625; F02D 41/2429–2483
See application file for complete search history.

(56) References Cited

FOREIGN PATENT DOCUMENTS

| JP | 3721922 B2 | * 11/2005 |
| JP | 2014-26345 A | 2/2014 |
| JP | 2015021452 A | * 2/2015 |

OTHER PUBLICATIONS

Mihira, JP 2014-0263452, machine translation. (Year: 2014).*

* cited by examiner

*Primary Examiner* — Hung Q Nguyen
*Assistant Examiner* — Mark L. Greene
(74) *Attorney, Agent, or Firm* — Keating and Bennett, LLP (57) ABSTRACT

A fuel management system to improve accuracy of calibration data to convert an output value of a fuel gauge into a remaining amount of fuel in a fuel tank includes a fuel tank mounted on a hull of a marine vessel, a fuel gauge to measure a liquid level position of fuel in the fuel tank, and a controller configured or programmed so that in a range where an output value of the fuel gauge changes, measurement reference points are set based on the output value of the fuel gauge. When supplying fuel to the fuel tank, the controller is configured or programmed to obtain calibration data showing a relationship between the output value of the fuel gauge and a remaining amount of the fuel in the fuel tank by comparing an amount of fuel supplied to the fuel tank at each of the measurement reference points and the output value of the fuel gauge at each of the measurement reference points.

17 Claims, 7 Drawing Sheets

FUEL MANAGEMENT SYSTEM CAPABLE OF IMPROVING ACCURACY OF CALIBRATION DATA FOR CONVERTING OUTPUT VALUE OF FUEL GAUGE INTO REMAINING AMOUNT OF FUEL IN FUEL TANK

CROSS REFERENCE TO RELATED APPLICATIONS

This application claims the benefit of priority to Japanese Patent Application No. 2021-118956, filed on Jul. 19, 2021. The entire contents of this application are hereby incorporated herein by reference.

BACKGROUND OF THE INVENTION

1. Field of the Invention

The present invention relates to a fuel management system.

2. Description of the Related Art

In a hull of a marine vessel, since a fuel tank is often placed in a gap (a space) generated after other fittings are placed, the shape of the fuel tank becomes complicated, and a remaining amount of fuel in the fuel tank is not proportional to a liquid level position of the fuel. Therefore, the liquid level position of the fuel does not accurately indicate the remaining amount of the fuel in the fuel tank, and an output value of a fuel gauge that measures the liquid level position of the fuel also cannot accurately indicate the remaining amount of the fuel. Therefore, it is necessary to obtain calibration data for converting the output value of the fuel gauge into the remaining amount of the fuel in the fuel tank.

Conventionally, when obtaining the calibration data, after emptying the fuel tank and while supplying the fuel to the fuel tank, an amount of fuel supply and the output value of the fuel gauge are compared to obtain the calibration data. Specifically, at the time of refueling, the output value of the fuel gauge is stored every time the fuel increases by a predetermined amount from a state when there is no fuel in the fuel tank, a process of calculating a change gradient of the stored output value is repeated a plurality of times, and an average value of the calculated change gradient is held as the calibration data (see, for example, Japanese Laid-Open Patent Publication (kokai) No. 2014-26345).

However, since the lower portion of the hull is narrowed, the lower portion of the fuel tank placed on the hull is also narrowed. As a result, in the case that the remaining amount of the fuel in the fuel tank is small, since the output value of the fuel gauge fluctuates greatly with respect to a change in the remaining amount of the fuel, especially in a region where the remaining amount of the fuel in the fuel tank is small, sometimes a discrepancy between the calibration data and an actual relationship between the output value of the fuel gauge and the remaining amount of the fuel in the fuel tank becomes large. Therefore, there is still room for improvement from the viewpoint of improving the accuracy of the calibration data.

SUMMARY OF THE INVENTION

Preferred embodiments of the present invention provide fuel management systems that are each able to improve the accuracy of calibration data to convert an output value of a fuel gauge into a remaining amount of fuel in a fuel tank.

According to a preferred embodiment of the present invention, a fuel management system includes a fuel tank mounted on a hull of a marine vessel, a fuel gauge to measure a liquid level position of fuel in the fuel tank, and a controller configured or programmed so that in a range where an output value of the fuel gauge changes, a plurality of measurement reference points are set based on the output value of the fuel gauge. When supplying fuel to the fuel tank, the controller is configured or programmed to obtain calibration data that shows a relationship between the output value of the fuel gauge and a remaining amount of the fuel in the fuel tank by comparing an amount of fuel supplied to the fuel tank at each of the plurality of measurement reference points and the output value of the fuel gauge at each of the plurality of measurement reference points.

According to a preferred embodiment of the present invention, when obtaining the calibration data by using the amount of fuel supplied to the fuel tank at each of the plurality of measurement reference points and the output value of the fuel gauge at each of the plurality of measurement reference points, each of the plurality of measurement reference points is set based on the output value of the fuel gauge. Therefore, even in a region where the output value of the fuel gauge fluctuates greatly with respect to a fluctuation in the amount of fuel, it is possible to set each of the plurality of measurement reference points so that the fluctuation in the output value of the fuel gauge between the adjacent measurement reference points does not become large. As a result, in the region where the output value of the fuel gauge fluctuates greatly with respect to a fluctuation in the amount of fuel in the fuel tank, it is possible to increase the amount of data used to obtain the calibration data, and thus it is possible to reduce the discrepancy between the calibration data and the actual relationship between the output value of the fuel gauge and the remaining amount of the fuel in the fuel tank. As a result, it is possible to improve the accuracy of the calibration data for converting the output value of the fuel gauge into the remaining amount of the fuel in the fuel tank.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
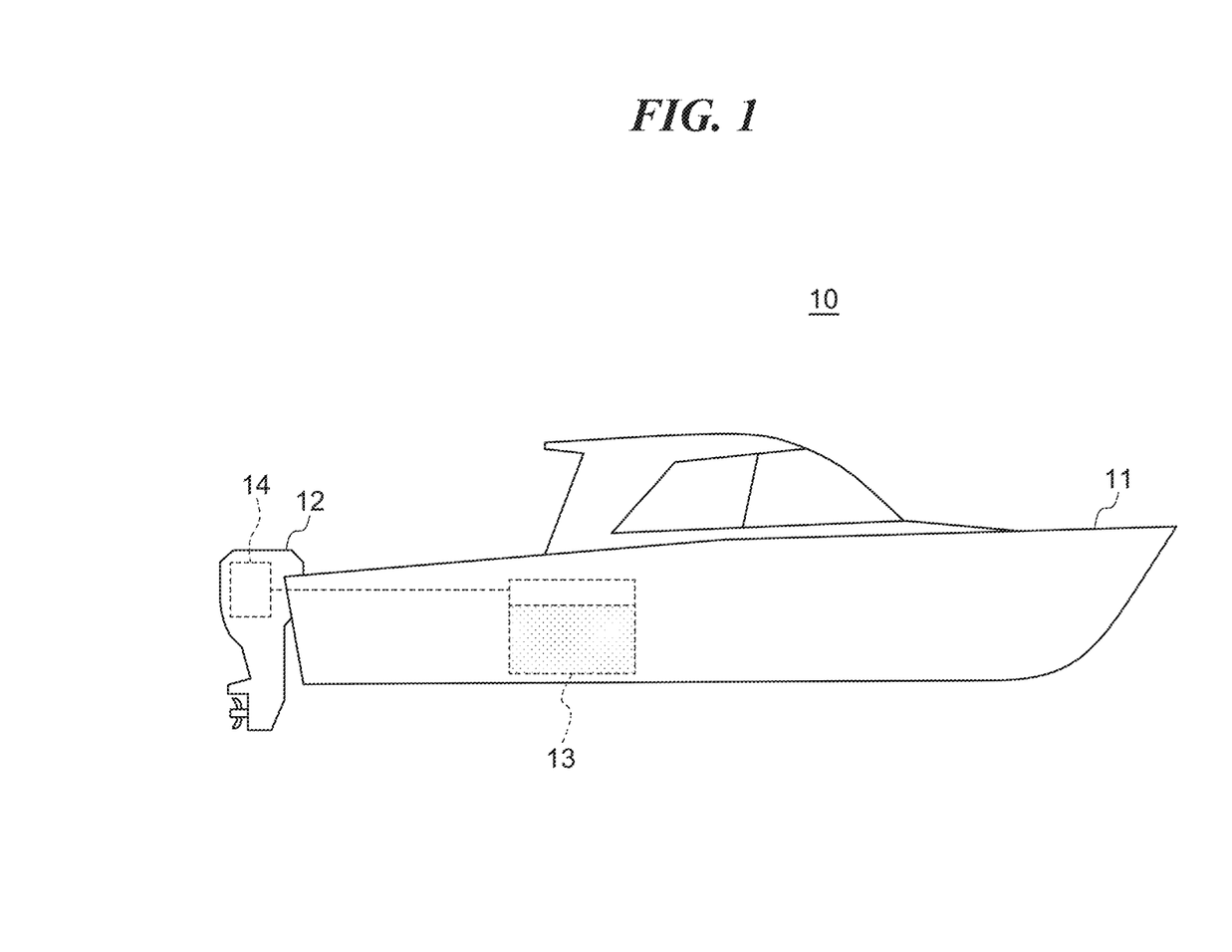
FIG. 1 is a side view that shows a marine vessel to which a fuel management system according to a preferred embodiment of the present invention is applied.
Figure 2:
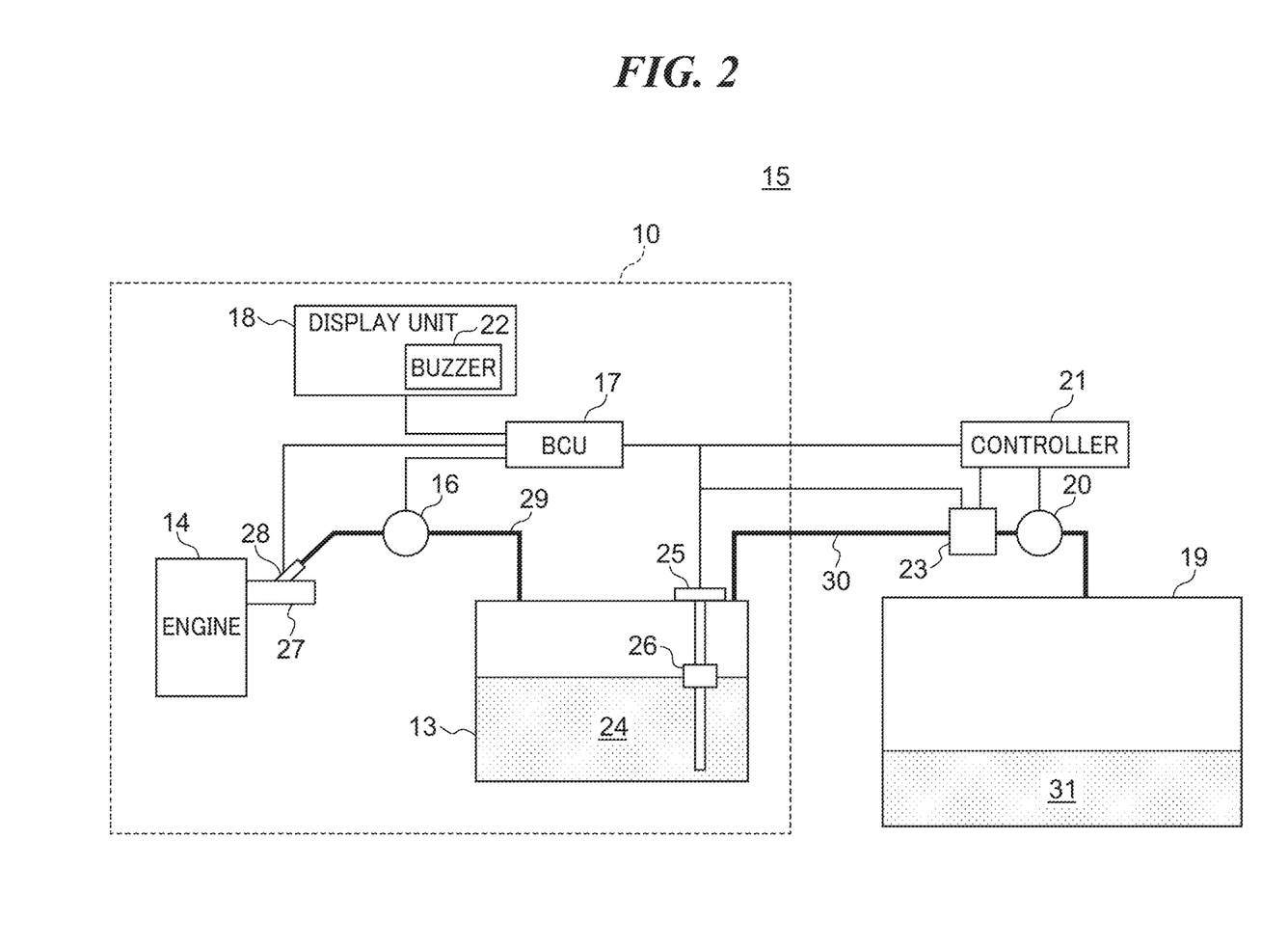
FIG. 2 is a block diagram that schematically shows a configuration of the fuel management system according to a preferred embodiment of the present invention.

FIG. 1 is a side view that shows a marine vessel to which a fuel management system according to a preferred embodiment of the present invention is applied. FIG. 2 is a block diagram that schematically shows a configuration of the fuel management system according to a preferred embodiment of the present invention.

As shown in FIG. 1, a marine vessel 10 includes a hull 11 and an outboard motor 12 attached to the stern of the hull 11, a fuel tank 13 mounted on the hull 11, and an engine 14 provided in the outboard motor 12. Further, as shown in FIG. 2, a fuel management system 15 includes the fuel tank 13, the engine 14, a fuel pump 16, a BCU (Boat Control Unit) 17 that functions a controller, a display unit 18, an external fuel supply tank 19, an external fuel pump 20, an external controller 21, and a fuel flow meter 23.

The fuel tank 13, the engine 14, the fuel pump 16, the BCU 17, and the display unit 18 are provided on the marine vessel 10. The external fuel supply tank 19, the external fuel pump 20, the external controller 21, and the fuel flow meter 23 are provided outside the marine vessel 10, for example, in a port facility.

The fuel tank 13 includes a fuel gauge 25 that measures a liquid level of fuel 24 accommodated in the fuel tank 13. The fuel gauge 25 includes a float 26 that floats on the fuel 24 and calculates the liquid level of the fuel 24 based on a displacement amount of the float 26 and then outputs the liquid level. In the present preferred embodiment, as the fuel gauge 25, although a lead type fuel gauge, in which the float 26 moves up and down along a guide, is used, an arm type fuel gauge, in which the float 26 is provided at the tip of an arm and the float 26 moves up and down as the arm swings, may be used. The engine 14 includes an intake manifold 27 that sucks in an air-fuel mixture, and an injector 28 (a fuel injection device) provided on the intake manifold 27. The fuel tank 13 and the engine 14 are connected by a fuel pipe 29, and the fuel pump 16 is provided on the fuel pipe 29. The fuel pump 16 pressure-feeds the fuel 24 in the fuel tank 13 to the injector 28.

The BCU 17 is connected to the fuel pump 16, the display unit 18, the fuel gauge 25, the injector 28, the external controller 21, and the fuel flow meter 23 by wiring, and receives output values from these respective components. The BCU 17 transmits signals to the fuel pump 16, the display unit 18, and the external controller 21 to control them. The BCU 17 obtains calibration data, which will be described below, based on the output values of the fuel flow meter 23, the fuel gauge 25, and the injector 28. Instead of the BCU 17, an ECU (Engine Control Unit) (not shown) included in the outboard motor 12 may be connected to the respective components of the fuel management system 15 and may execute the above-described functions of the BCU 17.

The display unit 18 displays a remaining amount of the fuel 24 and various kinds of messages according to a control performed by the BCU 17. The display unit 18 accepts an input of the output value of the fuel gauge 25 and an amount of fuel supply indicated by the fuel flow meter 23, which is performed by a user. The output value of the fuel gauge 25 and the amount of fuel supply, which are inputted, are transmitted to the BCU 17. The fuel gauge 25 outputs the liquid level position of the fuel 24 as the output value to the BCU 17 and displays it on the display unit 18. Furthermore, the display unit 18 functions as a notifier and further includes a buzzer 22, and causes the buzzer 22 to generate a notification sound (a buzzer sound) according to the control performed by the BCU 17. The injector 28 injects the pressure-fed fuel into the intake manifold 27 and supplies it to the engine 14. The injector 28 outputs an integrated value of the injected fuel to the BCU 17.

The external controller 21 is connected to the BCU 17, the external fuel pump 20, and the fuel flow meter 23 by wiring, and receives output values from these respective components. The external controller 21 receives a control signal from the BCU 17, and transmits a signal to the external fuel pump 20 based on the control signal to control the external fuel pump 20.

The external fuel supply tank 19 and the fuel tank 13 are connected by a fuel supply pipe 30, and the external fuel pump 20 is provided on the fuel supply pipe 30. The external fuel pump 20 pressure-feeds and supplies fuel 31 in the external fuel supply tank 19 to the fuel tank 13. The fuel flow meter 23 includes a display (not shown), and displays an amount of the fuel supplied by the external fuel pump 20 from the external fuel supply tank 19 to the fuel tank 13 (i.e., the amount of fuel supply) on the display. Further, the fuel flow meter 23 outputs the amount of fuel to the BCU 17 and the external controller 21.

The fuel supply pipe 30 is provided outside the marine vessel 10. When the marine vessel 10 comes alongside a pier or the like, the fuel supply pipe 30 is connected to the fuel tank 13 of the marine vessel 10. Further, when the marine vessel 10 comes alongside the pier or the like, the external controller 21 and the fuel flow meter 23 are also connected to the BCU 17.

Figure 3:
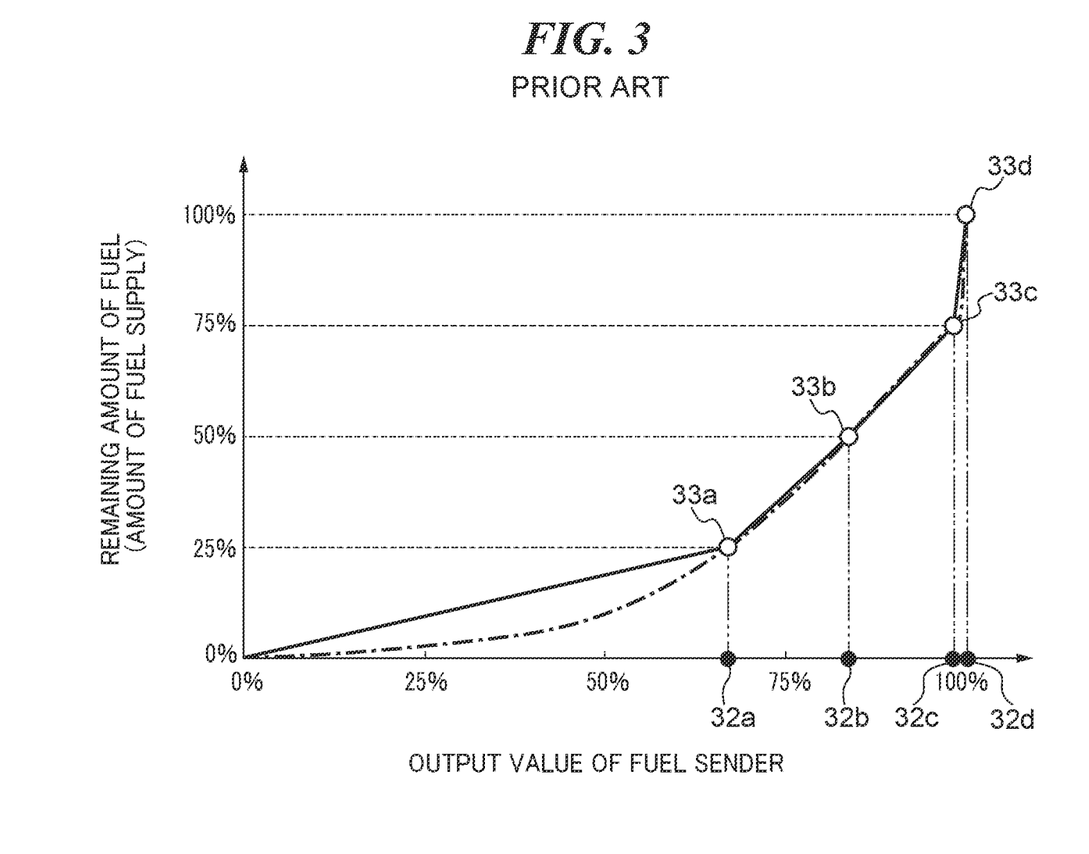
FIG. 3 is a graph for explaining a conventional method of obtaining calibration data that shows a relationship between an output value of a fuel gauge and a remaining amount of fuel in a fuel tank.

FIG. 3 is a graph for explaining a conventional method of obtaining the calibration data that shows a relationship between the output value of the fuel gauge and the remaining amount of the fuel in the fuel tank. In the graph of FIG. 3, the horizontal axis indicates the output value of the fuel gauge 25, and the vertical axis indicates the remaining amount of the fuel 24 in the fuel tank 13.

In the conventional method of obtaining the calibration data, first, the user of the marine vessel 10 empties the fuel tank 13. The user stores the output value of the fuel gauge 25 at this time in the BCU 17 an output value of 0 when the remaining amount of the fuel 24 in the fuel tank 13 is 0, and simultaneously starts supplying fuel with the external fuel pump 20 from the external fuel supply tank 19 to the fuel tank 13. Since the remaining amount of the fuel 24 in the fuel tank 13 at this time becomes equal to the amount of the fuel supplied from the external fuel supply tank 19 (the amount of fuel supply), the vertical axis of the graph of FIG. 3 also indicates the amount of fuel supply.

After that, the supplying of fuel by the external fuel pump 20 from the external fuel supply tank 19 to the fuel tank 13 is continued, and every time the amount of fuel supply increases by a predetermined amount, the user stores the output value of the fuel gauge 25 in the BCU 17, and the BCU 17 obtains the calibration data based on the amount of fuel supply increased by the predetermined amount and the output value of the fuel gauge 25 at that time.

For example, in the example of FIG. 3, every time the amount of fuel supply increases by 25% of a total capacity of the fuel tank 13, the user stores output values 32a, 32b, 32c, and 32d (indicated by black circles in FIG. 3) of the fuel gauge 25 at that time in the BCU 17. After that, the BCU 17 plots an intersection point 33a (indicated by a white circle in FIG. 3), at which a line segment (indicated by a broken line in FIG. 3) horizontally extending from a position where the remaining amount of the fuel 24 in the fuel tank 13 becomes 25% and a line segment (indicated by a two-dot chain line in FIG. 3) vertically extending from the stored output value 32a intersect in the graph of FIG. 3. Further, the BCU 17 plots an intersection point 33b (indicated by a white circle in FIG. 3), at which a line segment (indicated by a broken line in FIG. 3) horizontally extending from a position where the remaining amount of the fuel 24 in the fuel tank 13 becomes 50% and a line segment (indicated by a two-dot chain line in FIG. 3) vertically extending from the stored output value 32b intersect in the graph of FIG. 3. Furthermore, the BCU 17 plots an intersection point 33c (indicated by a white circle in FIG. 3), at which a line segment (indicated by a broken line in FIG. 3) horizontally extending from a position where the remaining amount of the fuel 24 in the fuel tank 13 becomes 75% and a line segment (indicated by a two-dot chain line in FIG. 3) vertically extending from the stored output value 32c intersect in the graph of FIG. 3. Similarly, the BCU 17 plots an intersection point 33d (indicated by a white circle in FIG. 3), at which a line segment (indicated by a broken line in FIG. 3) horizontally extending from a position where the remaining amount of the fuel 24 in the fuel tank 13 becomes 100% and a line segment (indicated by a two-dot chain line in FIG. 3) vertically extending from the stored output value 32d intersect in the graph of FIG. 3.

After that, the BCU 17 obtains polygonal line data (indicated by a solid line in FIG. 3), which includes a line segment connecting the origin of the graph of FIG. 3 and the intersection point 33a, a line segment connecting the intersection point 33a and the intersection point 33b, a line segment connecting the intersection point 33b and the intersection point 33c, and a line segment connecting the intersection point 33c and the intersection point 33d, as the calibration data. Since each of the intersection points 33a to 33d is data used to obtain the calibration data, it is hereinafter referred to as "sample data" in the present preferred embodiment.

Since the lower portion of the hull 11 of the marine vessel 10 is usually narrowed, the lower portion of the fuel tank 13 is also narrowed. As a result, in the case that the remaining amount of the fuel 24 in the fuel tank 13 is small, the liquid level position of the fuel 24 fluctuates greatly with respect to a change in the remaining amount of the fuel 24. Therefore, in an actual relationship between the remaining amount of the fuel 24 in the fuel tank 13 (the amount of fuel supply) and the output value of the fuel gauge 25 (hereinafter simply referred to as "an actual relationship"), as shown by a one-dot chain line in FIG. 3, in a region where the remaining amount of the fuel 24 in the fuel tank 13 (the amount of fuel supply) is small, the output value of the fuel gauge 25 fluctuates greatly with respect to a fluctuation in the amount of fuel supply.

As described above, in the conventional method of obtaining the calibration data, since the output value of the fuel gauge 25 is stored every time the amount of fuel supply increases by the predetermined amount, it is not possible to obtain a large number of the sample data in the region where the amount of fuel supply is small. For example, as shown in the graph of FIG. 3, in a range where the amount of fuel supply is 25% or less, only sample data 33a is obtained. That is, it is not possible to obtain a large number of the sample data in a region where the output value of the fuel gauge 25 fluctuates greatly with respect to the fluctuation in the amount of fuel supply.

Therefore, especially in the region where the amount of fuel supply is small (in the region where the output value of the fuel gauge 25 fluctuates greatly with respect to the fluctuation in the amount of fuel supply), sometimes a discrepancy between the actual relationship and the calibration data becomes large. For example, in the graph of FIG. 3, in a region where the amount of fuel supply changes from 0% to 25% (in a region where the output value of the fuel gauge 25 changes from 0% to about 65%), the discrepancy between the actual relationship and the calibration data becomes large.

In the present preferred embodiment, in order to overcome this issue, the method of obtaining the calibration data is devised, and the number of the sample data is increased in the region where the output value of the fuel gauge 25 fluctuates greatly with respect to the fluctuation in the amount of fuel supply.

Figure 4:
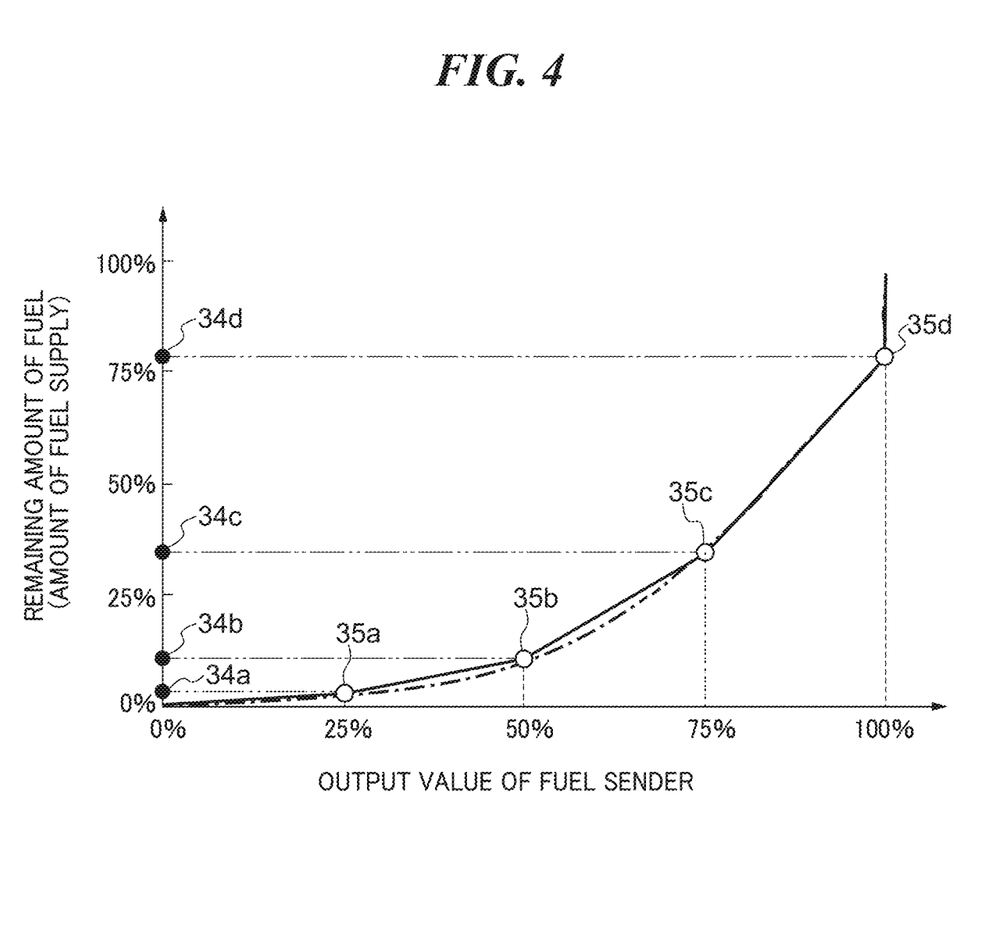
FIG. 4 is a graph for explaining a method of obtaining the calibration data that shows the relationship between the output value of the fuel gauge and the remaining amount of the fuel in the fuel tank according to a preferred embodiment of the present invention.

FIG. 4 is a graph for explaining a method of obtaining the calibration data that shows the relationship between the output value of the fuel gauge and the remaining amount of the fuel in the fuel tank according to a preferred embodiment of the present invention. In the graph of FIG. 4, the horizontal axis indicates the output value of the fuel gauge 25, and the vertical axis indicates the remaining amount of the fuel 24 in the fuel tank 13 or the amount of fuel supply.

In the present preferred embodiment, in order to increase the number of the sample data in the region where the output value of the fuel gauge 25 fluctuates greatly with respect to the fluctuation in the amount of fuel supply, the BCU 17 sets a plurality of measurement reference points based on the output value of the fuel gauge 25.

Specifically, in a range where the output value of the fuel gauge 25 changes from 0% to 100%, the BCU 17 sets a plurality of the output values of the fuel gauge 25 as the plurality of measurement reference points at equal intervals. For example, a plurality of the output values of the fuel gauge 25 that increases by 25% from 0% at equal intervals is set as each of the plurality of measurement reference points, and amounts of the fuel supply 34a, 34b, 34c, and 34d (indicated by black circles in FIG. 4) at each of the plurality of measurement reference points are stored in the BCU 17. At this time, as shown in the graph of FIG. 4, in a range where the amount of fuel supply is about 35% or less, which is the region where the output value of the fuel gauge 25 fluctuates greatly with respect to the fluctuation in the amount of fuel supply (in a region where the output value of the fuel gauge 25 is converted from 0% to 75% with respect to that the amount of fuel supply changes from 0% to 35%), it is possible to obtain three pieces of sample data 35a, 35b, and 35c (indicated by white circles in FIG. 4).

That is, in the region where the output value of the fuel gauge 25 fluctuates greatly with respect to the fluctuation in the amount of fuel supply, it is possible to increase the number of the sample data as compared with the conventional method of obtaining the calibration data. As a result, as shown in the graph of FIG. 4, in the region where the output value of the fuel gauge 25 fluctuates greatly with respect to the fluctuation in the amount of fuel supply, it is possible to reduce the discrepancy between the calibration data and the actual relationship, thus, it is possible to improve the accuracy of the calibration data.

Next, the method of obtaining the calibration data according to a preferred embodiment of the present invention will be specifically described with reference to FIG. 4.

In the method of obtaining the calibration data, first, the user of the marine vessel 10 empties the fuel tank 13. At this time, the float 26 of the fuel gauge 25 is located at the lowest position in a movable range, and the output value of the fuel gauge 25 becomes 0%. The user reads the amount of fuel supply (actually 0%) displayed by the fuel flow meter 23 at this time, and stores it in the BCU 17 via the display unit 18 as the amount of fuel supply when the output value of the fuel gauge 25 is 0%, and simultaneously starts supplying fuel with the external fuel pump 20 from the external fuel supply tank 19 to the fuel tank 13.

After that, the supplying of fuel by the external fuel pump 20 from the external fuel supply tank 19 to the fuel tank 13 is continued, and when the output value of the fuel gauge 25 reaches 25% (a first measurement reference point), the user temporarily stops the supplying of fuel by the external fuel pump 20 from the external fuel supply tank 19 to the fuel tank 13, reads the amount of fuel supply 34a displayed by the fuel flow meter 23 at this time, and stores it in the BCU 17 via the display unit 18. Then, the user restarts the supplying of fuel by the external fuel pump 20 from the external fuel supply tank 19 to the fuel tank 13, and when the output value of the fuel gauge 25 reaches 50% (a second measurement reference point), the user temporarily stops the supplying of fuel by the external fuel pump 20 from the external fuel supply tank 19 to the fuel tank 13, reads the amount of fuel supply 34b displayed by the fuel flow meter 23 at this time, and stores it in the BCU 17 via the display unit 18.

Next, the user restarts the supplying of fuel by the external fuel pump 20 from the external fuel supply tank 19 to the fuel tank 13, and when the output value of the fuel gauge 25 reaches 75% (a third measurement reference point), the user temporarily stops the supplying of fuel by the external fuel pump 20 from the external fuel supply tank 19 to the fuel tank 13, reads the amount of fuel supply 34c displayed by the fuel flow meter 23 at this time, and stores it in the BCU 17 via the display unit 18. Then, the user restarts the supplying of fuel by the external fuel pump 20 from the external fuel supply tank 19 to the fuel tank 13, and when the output value of the fuel gauge 25 reaches 100% (a fourth measurement reference point), the user temporarily stops the supplying of fuel by the external fuel pump 20 from the external fuel supply tank 19 to the fuel tank 13, reads the amount of fuel supply 34d displayed by the fuel flow meter 23 at this time, and stores it in the BCU 17 via the display unit 18.

Even in the case that the float 26 of the fuel gauge 25 in the fuel tank 13 reaches the highest position in the movable range, sometimes there is a free capacity and it is possible to further supply the fuel to the fuel tank 13. While the fuel is supplied to this free capacity, although the output value of the fuel gauge 25 remains unchanged at 100%, in the present preferred embodiment, the amount of fuel supply at a time when the output value of the fuel gauge 25 becomes 100% is stored as the amount of fuel supply 34d when the output value of the fuel gauge 25 is 100%.

In addition, the capacity of the fuel tank of the marine vessel is generally large, and it is possible for the fuel tank to accommodate, for example, about 1000 liters of fuel. Therefore, it takes a lot of time to supply fuel to the fuel tank, for example, in the above-described method of obtaining the calibration data, after the user reads the amount of fuel supply displayed by the fuel flow meter 23 at one measurement reference point, sometimes it takes several minutes or more until the user reads the amount of fuel supply displayed by the fuel flow meter 23 at the next measurement reference point. Therefore, there is a possibility that the user who reads the amount of fuel supply at one measurement reference point becomes distracted while waiting for the next measurement reference point and inadvertently forgets to read the amount of fuel supply at the next measurement reference point.

Therefore, according to a preferred embodiment of the present invention, during the supplying of fuel by the external fuel pump 20 from the external fuel supply tank 19 to the fuel tank 13, when the output value of the fuel gauge 25 reaches a value lower than each of the plurality of measurement reference points by a predetermined value, for example, 5%, a notification sound is generated from the buzzer 22 of the display unit 18 to notify the user that the output value of the fuel gauge 25 will soon reach the measurement reference point. Specifically, the BCU 17 monitors the output value of the fuel gauge 25, and when the output value of the fuel gauge 25 reaches the value lower than each of the plurality of measurement reference points by the predetermined value, the BCU 17 transmits a signal to the display unit 18 and causes the buzzer 22 to generate the notification sound. It should be noted that the marine vessel 10 usually includes a buzzer (not shown) attached to a key switch (not shown) of the outboard motor 12. In such a case, when the output value of the fuel gauge 25 reaches the value lower than each of the plurality of measurement reference points by the predetermined value, instead of the buzzer 22, the BCU 17 may cause the buzzer attached to the key switch to generate the notification sound.

As a result, the user waiting for the next measurement reference point is able to recognize that the output value of the fuel gauge 25 will soon reach the measurement reference point, and thus, in order to prepare to read the amount of fuel supply, the user will not forget to read the amount of fuel supply at the next measurement reference point.

When the output value of the fuel gauge 25 reaches the value lower than each of the plurality of measurement reference points by the predetermined value, instead of causing the buzzer 22 to generate the notification sound, a prediction time until the output value of the fuel gauge 25 reaches the next measurement reference point may be displayed on the display unit 18 or a display unit (not shown) provided outside the marine vessel. As a result, the user waiting for the next measurement reference point is able to prepare to read the amount of fuel supply with a margin.

Now, returning to the description of the method of obtaining the calibration data. After the amounts of fuel supply 34a, 34b, 34c, and 34d corresponding to each of the plurality of measurement reference points are stored, the BCU 17 plots the sample data 35a (indicated by a white circle in FIG. 4), at which a line segment (indicated by a broken line in FIG. 4) vertically extending from a position where the output value of the fuel gauge 25 becomes 25% and a line segment (indicated by a two-dot chain line in FIG. 4) horizontally extending from the amount of fuel supply 34a that is stored intersect in the graph of FIG. 4. Further, the BCU 17 plots the sample data 35b (indicated by a white circle in FIG. 4), at which a line segment (indicated by a broken line in FIG. 4) vertically extending from a position where the output value of the fuel gauge 25 becomes 50% and a line segment (indicated by a two-dot chain line in FIG. 4) horizontally extending from the amount of fuel supply 34b that is stored intersect in the graph of FIG. 4. Furthermore, the BCU 17 plots the sample data 35c (indicated by a white circle in FIG. 4), at which a line segment (indicated by a broken line in FIG. 4) vertically extending from a position where the output value of the fuel gauge 25 becomes 75% and a line segment (indicated by a two-dot chain line in FIG. 4) horizontally extending from the amount of fuel supply 34c that is stored intersect in the graph of FIG. 4. Similarly, the BCU 17 plots the sample data 35d (indicated by a white circle in FIG. 4), at which a line segment (indicated by a broken line in FIG. 4) vertically extending from a position where the output value of the fuel gauge 25 becomes 100% and a line segment (indicated by a two-dot chain line in FIG. 4) horizontally extending from the amount of fuel supply 34d that is stored intersect in the graph of FIG. 4.

After that, the BCU 17 obtains polygonal line data (indicated by a solid line in FIG. 4), which includes a line segment connecting the origin of the graph of FIG. 4 and the sample data 35a, a line segment connecting the sample data 35a and the sample data 35b, a line segment connecting the sample data 35b and the sample data 35c, and a line segment connecting the sample data 35c and the sample data 35d. This polygonal line data becomes the calibration data.

According to the present preferred embodiment, in the range where the output value of the fuel gauge 25 changes from 0% to 100%, the BCU 17 sets the plurality of the output values of the fuel gauge 25 as the plurality of measurement reference points at equal intervals. As a result, it is possible to increase the number of the sample data in the region where the output value of the fuel gauge 25 fluctuates greatly with respect to the fluctuation in the amount of fuel supply, thus, it is possible to reduce the discrepancy between the calibration data and the actual relationship, and it is possible to improve the accuracy of the calibration data.

In the above-described method of obtaining the calibration data, at each of the plurality of measurement reference points, the user reads the amount of fuel supply displayed by the fuel flow meter 23 and stores it in the BCU 17 via the display unit 18. However, the amounts of fuel supply 34a, 34b, 34c, and 34d may be obtained by the BCU 17 monitoring the output value of the fuel gauge 25 and the amount of fuel supply displayed by the fuel flow meter 23, and storing the amount of fuel supply displayed by the fuel flow meter 23 when the output value of the fuel gauge 25 reaches each of the plurality of measurement reference points.

In the case of FIG. 4, the plurality of the output values of the fuel gauge 25 that increases by 25% from 0% at equal intervals is set as each of the plurality of measurement reference points. However, in the region where the output value of the fuel gauge 25 fluctuates greatly with respect to the fluctuation in the amount of fuel supply, since if each of the plurality of measurement reference points is set so that the fluctuation in the output value of the fuel gauge between the adjacent measurement reference points does not become large, it is possible to increase the number of the sample data in the region where the output value of the fuel gauge 25 fluctuates greatly with respect to the fluctuation in the amount of fuel supply, it is not always necessary to set each of the plurality of measurement reference points at equal intervals.

Figure 5:
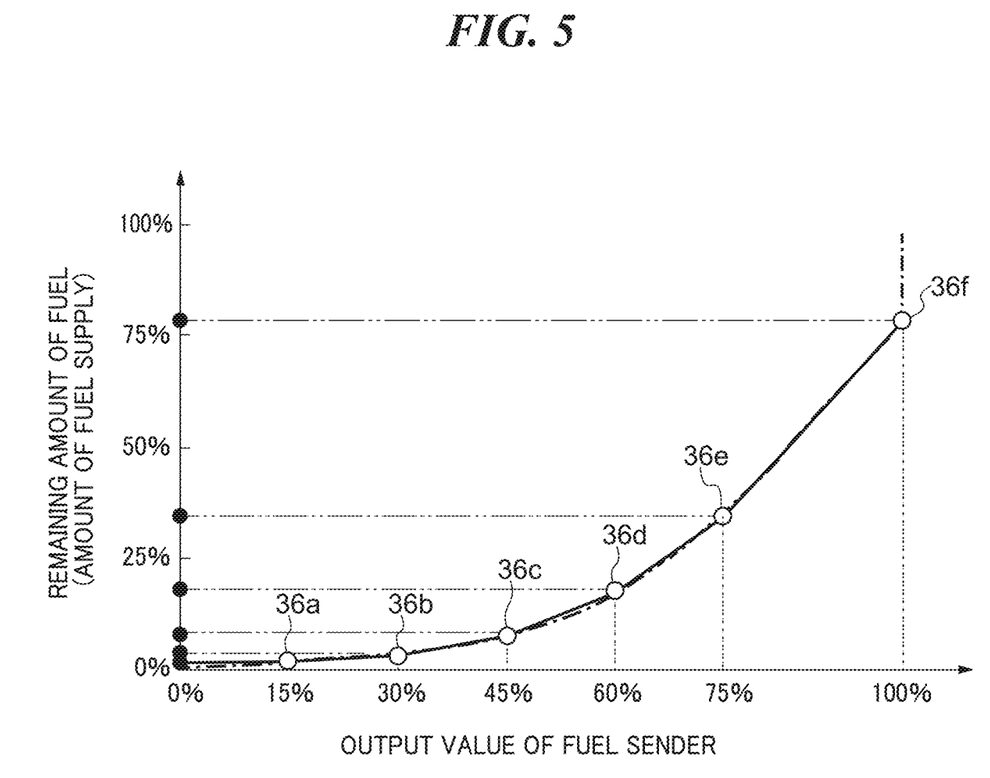
FIG. 5 is a graph for explaining a modified example of the method of obtaining the calibration data according to a preferred embodiment of the present invention.

For example, as shown in a graph of FIG. 5, in the region where the output value of the fuel gauge 25 fluctuates greatly with respect to the fluctuation in the amount of fuel supply, in order to increase the number of the sample data, a plurality of the output values of the fuel gauge 25 that increases by 15% from 0% may be set as each of the plurality of measurement reference points, and in a region other than the region where the output value of the fuel gauge 25 fluctuates greatly with respect to the fluctuation in the amount of fuel supply, the output value of the fuel gauge 25 that increases by 25% may be set as the measurement reference point. At this time, although it is possible to obtain a total of six pieces of sample data 36a, 36b, 36c, 36d, 36e, and 36f (indicated by white circles in FIG. 5), in the range where the amount of fuel supply is about 35% or less, which is the region where the output value of the fuel gauge 25 fluctuates greatly with respect to the fluctuation in the amount of fuel supply, it is possible to obtain five pieces of the sample data 36a, 36b, 36c, 36d, and 36e. As a result, it is possible to further reduce the discrepancy between the calibration data and the actual relationship.

In the case that there is a plurality of marine vessels 10 of the same type, with respect to one of the plurality of marine vessels 10, after obtaining the calibration data that shows the relationship between the output value of the fuel gauge and the remaining amount of the fuel in the fuel tank, sometimes this calibration data is copied to other marine vessels 10 of the same type. In this case, since there is a possibility of accidentally copying the calibration data of other types of marine vessels, with respect to the marine vessel 10 whose calibration data is the copied calibration data, it is preferable to verify whether or not the copied calibration data is appropriate.

Figure 6:
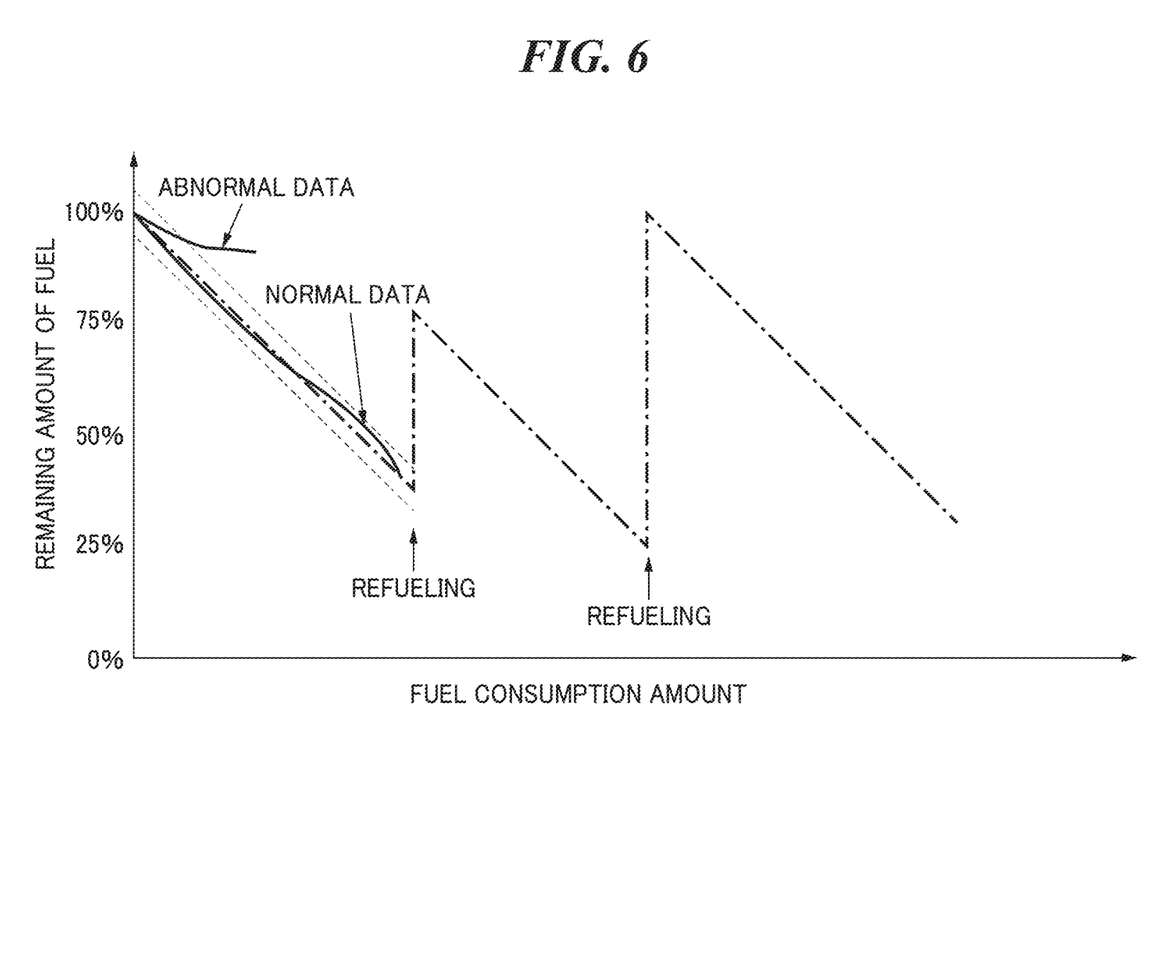
FIG. 6 is a graph for explaining a method of verifying the copied calibration data according to a preferred embodiment of the present invention.

FIG. 6 is a graph for explaining a method of verifying the copied calibration data according to a preferred embodiment of the present invention. In this method of verifying the copied calibration data, a remaining amount of the fuel 24 in the fuel tank 13 calculated based on a fuel consumption amount (hereinafter simply referred to as "a remaining amount of the fuel") is compared with a remaining amount of the fuel calculated based on the copied calibration data. It should be noted that the fuel consumption amount is the integrated value of the fuel injected by the injector 28. In the graph of FIG. 6, the horizontal axis indicates the fuel consumption amount, and the vertical axis indicates the remaining amount of the fuel.

In the graph of FIG. 6, a one-dot chain line indicates a relationship between the remaining amount of the fuel calculated based on the fuel consumption amount (hereinafter referred to as "a second remaining amount") and the fuel consumption amount. It should be noted that the second remaining amount is a value obtained by subtracting the fuel consumption amount from the total capacity of the fuel tank 13. As described above, since the fuel consumption amount is the integrated value of the fuel injected by the injector 28 and is an accurate value, the second remaining amount also becomes an accurate value and is able to be used as a reference.

In this method of verifying the copied calibration data, first, the user fills the total capacity of the fuel tank 13 with fuel, and then, the user operates the engine 14 of the outboard motor 12 to consume the fuel 24. At this time, the BCU 17 calculates the fuel consumption amount based on the output value of the injector 28, further calculates the second remaining amount based on the calculated fuel consumption amount, and plots the second remaining amount and the fuel consumption amount at a time when the second remaining amount is calculated in the graph of FIG. 6.

Further, the BCU 17 calculates the remaining amount of the fuel (hereinafter referred to as "a first remaining amount") based on the output value of the fuel gauge 25 and the calibration data, and plots the first remaining amount and the fuel consumption amount at a time when the first remaining amount is calculated in the graph of FIG. 6. It should be noted that a solid line indicates a relationship between the first remaining amount and the fuel consumption amount in the graph of FIG. 6.

However, as described above, when the float 26 of the fuel gauge 25 in the fuel tank 13 reaches the highest position in the movable range, sometimes there is the free capacity, even in the case that the fuel 24 is consumed and the liquid level drops, sometimes the output value of the fuel gauge 25 does not change. Therefore, in the present preferred embodiment, after the output value of the fuel gauge 25 starts to change and the first remaining amount starts to change, the BCU 17 plots the second remaining amount, the fuel consumption amount at the time when the second remaining amount is calculated, the first remaining amount, and the fuel consumption amount at the time when the first remaining amount is calculated in the graph of FIG. 6.

Then, the BCU 17 continues to compare the first remaining amount and the second remaining amount in the same fuel consumption amount, and in the case that the first remaining amount deviates from the second remaining amount by a predetermined value or more, the BCU 17 judges that the first remaining amount is abnormal data and the calibration data used for calculating the first remaining amount is abnormal. Here, the predetermined value used for the judgment is, for example, 10%, preferably 5%. In the present preferred embodiment, in the case that the first remaining amount deviates from the second remaining amount by 10% or more, the BCU 17 judges that the calibration data is abnormal and the calibration data is not copied correctly. Further, in the case of judging that the calibration data is abnormal, the BCU 17 displays, for example, an error message on the display unit 18, and notifies the user that the calibration data is not copied correctly.

On the other hand, in the case that an absolute value of a deviation amount of the first remaining amount with respect to the second remaining amount is less than 10% of the second remaining amount, the BCU 17 judges that the first remaining amount is normal data, the calibration data is normal, and the calibration data is copied correctly. It should be noted that a thin broken line indicates a range corresponding to the predetermined value in the graph of FIG. 6.

Since the verification of the calibration data uses the output value of the fuel gauge 25, it is premised that the output value of the fuel gauge 25 is accurate. In order for the output value of the fuel gauge 25 to be accurate, it is necessary that the liquid level of the fuel 24 of the fuel tank 13 is not shaking and the float 26 is stable.

Therefore, only in the case of judging that the liquid level of the fuel 24 of the fuel tank 13 is not shaking and the float 26 is stable, the BCU 17 executes the method of verifying the copied calibration data shown in FIG. 6.

On the other hand, in the case of judging that the liquid level of the fuel 24 of the fuel tank 13 is shaking and the float 26 is moving, the BCU 17 does not execute the method of verifying the copied calibration data shown in FIG. 6. Specifically, in the case that the marine vessel 10 is accelerating or decelerating and the hull 11 is tilted, in the case that the hull 11 is shaking due to waves or wind, or in the case that the output value of the fuel gauge 25 is not stable and vibrates slightly and quickly due to other factors, the BCU 17 judges that the liquid level of the fuel 24 in the fuel tank 13 is shaking, and does not execute the method of verifying the copied calibration data shown in FIG. 6.

In order for the output value of the fuel gauge 25 to be accurate, since it is necessary that the float 26 does not stick and works normally, the BCU 17 judges whether or not the float 26 of the fuel gauge 25 sticks.

For example, in the case that the output value of the fuel gauge 25 corresponds to the movable range of the float 26, when the first remaining amount is not decreasing despite that the second remaining amount is decreasing, the BCU 17 judges that the float 26 sticks and does not follow a drop in the liquid level position of the fuel 24 despite that the fuel consumption amount increases and the remaining amount of the fuel in the fuel tank 13 is decreasing.

Further, in the case that the output value of the fuel gauge 25 corresponds to the movable range of the float 26, when the first remaining amount does not change despite that it is judged that the liquid level of the fuel 24 of the fuel tank 13 is shaking or tilting due to that the marine vessel 10 is accelerating or decelerating and the hull 11 is tilted, or due to that that the hull 11 is shaking due to waves or wind, the BCU 17 judges that the float 26 sticks and does not follow the shaking or tilting of the liquid level of the fuel 24.

The movable range of the float 26 in the fuel tank 13 is, for example, a range from a liquid level height of the fuel at about 20% of the total capacity of the fuel tank 13 to an oil level height of the fuel at about 80% of the total capacity of the fuel tank 13.

In the case of judging that the float 26 of the fuel gauge 25 sticks, the BCU 17 does not execute the method of verifying the copied calibration data shown in FIG. 6.

As described above, since the second remaining amount is the value obtained by subtracting the fuel consumption amount from the total capacity of the fuel tank 13, and is not a value obtained by directly measuring the liquid level position of the fuel 24 of the fuel tank 13, when the fuel is refueled to the fuel tank 13, the second remaining amount is not able to accurately represent the remaining amount of the fuel.

Therefore, in the case of being judged that the fuel is refueled to the fuel tank 13, the BCU 17 temporarily stops the method of verifying the copied calibration data shown in FIG. 6, and then restarts it. The case of being judged that the fuel is refueled to the fuel tank 13 is, for example, when the second remaining amount does not change despite that the first remaining amount is increasing, or when a shift position of the marine vessel 10 is neutral (a refueling position) and the first remaining amount increases.

When restarting the method of verifying the copied calibration data shown in FIG. 6, sometimes enough fuel is not refueled and the total capacity of the fuel tank 13 is not completely filled. In this case, the BCU 17 sets the second remaining amount, at a time when the method of verifying the copied calibration data is restarted, to the same value as the first remaining amount, and then restarts the method of verifying the copied calibration data shown in FIG. 6.

In a preferred embodiment of the present invention, in the method of verifying the copied calibration data shown in FIG. 6, in the case of being judged that the calibration data is abnormal, the calibration data is reobtained. When reobtaining the calibration data, first, the total capacity of the fuel tank 13 is filled with the fuel without first emptying the fuel tank 13 as in the method of obtaining the calibration data shown in FIG. 4.

Figure 7:
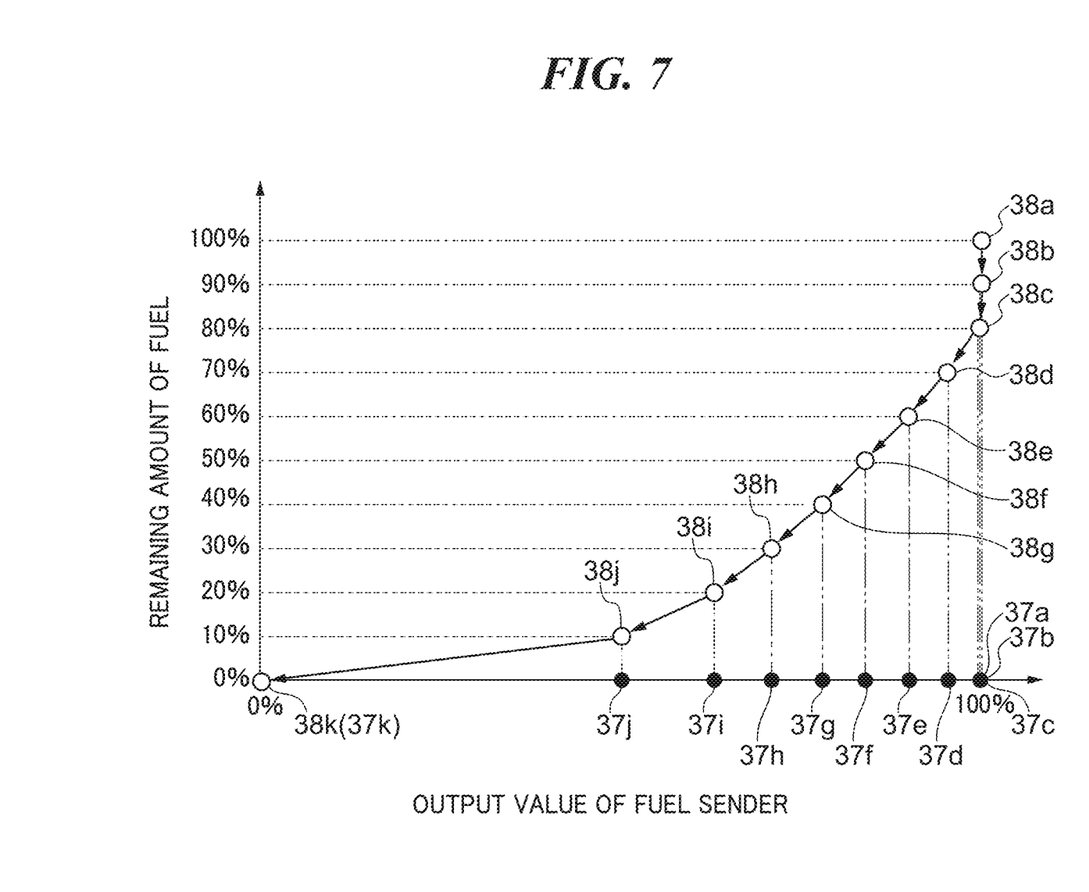
FIG. 7 is a graph for explaining a method of reobtaining the calibration data according to a preferred embodiment of the present invention.

FIG. 7 is a graph for explaining a method of reobtaining the calibration data according to a preferred embodiment of the present invention. In this method of reobtaining the calibration data, the above-described second remaining amount calculated by using the integrated value of the fuel injected by the injector 28 is compared with the output value of the fuel gauge 25. Further, in the graph of FIG. 7, the horizontal axis indicates the output value of the fuel gauge 25, and the vertical axis indicates the remaining amount of the fuel (the second remaining amount).

In this method of reobtaining the calibration data, first, the user fills the total capacity of the fuel tank 13 with the fuel, and then, the user operates the engine 14 of the outboard motor 12 to consume the fuel 24. Further, the BCU 17 stores the output value of the fuel gauge 25 at this time as an output value 37a of the fuel gauge 25 when the second remaining amount is 100%. Then, the BCU 17 stores respective output values 37b, 37c, 37d, 37e, 37f, 37g, 37h, 37i, 37j, and 37k of the fuel gauge 25 at every time when the fuel consumption amount increases and the second remaining amount decreases by 10%.

Then, after storing the output values 37a, 37b, 37c, 37d, 37e, 37f, 37g, 37h, 37i, 37j, and 37k of the fuel gauge 25, the BCU 17 plots sample data 38a (indicated by a white circle in FIG. 7), at which a line segment (indicated by a broken line in FIG. 7) horizontally extending from a position where the second remaining amount becomes 100% and a line segment (indicated by a two-dot chain line in FIG. 7) vertically extending from the stored output value 37a of the fuel gauge 25 intersect in the graph of FIG. 7. After that, with respect to each of positions where the second remaining amount becomes 90%, 80%, 70%, 60%, 50%, 40%, 30%, 20%, 10%, and 0%, the BCU 17 performs the same operation as the position where the second remaining amount becomes 100%, and plots sample data 38b, 38c, 38d, 38e, 38f, 38g, 38h, 38i, 38j, and 38k (indicated by white circles in FIG. 7) in the graph of FIG. 7.

After that, the BCU 17 obtains polygonal line data (indicated by a solid line in FIG. 7), which includes a line segment connecting the sample data 38a and the sample data 38b, a line segment connecting the sample data 38b and the sample data 38c, a line segment connecting the sample data 38c and the sample data 38d, a line segment connecting the sample data 38d and the sample data 38e, a line segment connecting the sample data 38e and the sample data 38f, a line segment connecting the sample data 38f and the sample data 38g, a line segment connecting the sample data 38g and the sample data 38h, a line segment connecting the sample data 38h and the sample data 38i, a line segment connecting the sample data 38i and the sample data 38j, and a line segment connecting the sample data 38j and the sample data 38k. This polygonal line data becomes the calibration data.

In the method of reobtaining the calibration data shown in FIG. 7, although the respective output values of the fuel gauge 25 are stored at every time when the second remaining amount decreases by 10%, times for storing the respective output values of the fuel gauge 25 are not limited to these times, and are able to be arbitrarily set.

Although preferred embodiments of the present invention have been described above, the present invention is not limited to the above-described preferred embodiments, and various modifications and changes can be made within the scope of the gist thereof.

For example, after obtaining the calibration data by the method of obtaining the calibration data shown in FIG. 4, in the same marine vessel 10, the calibration data may also be obtained by the method of reobtaining the calibration data shown in FIG. 7, and the average of these two pieces of the calibration data may be obtained again as regular calibration data.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel management system comprising:
   a fuel tank mounted on a hull of a marine vessel;
   a fuel gauge to measure a liquid level position of fuel in the fuel tank; and
   a controller configured or programmed so that in a range where an output value of the fuel gauge changes, a plurality of measurement reference points are set based on the output value of the fuel gauge; wherein
   when supplying fuel to the fuel tank, the controller is configured or programmed to obtain calibration data that shows a relationship between the output value of the fuel gauge and a remaining amount of the fuel in the fuel tank by comparing an amount of fuel supplied to the fuel tank at each of the plurality of measurement reference points and the output value of the fuel gauge at each of the plurality of measurement reference points.

2. The fuel management system according to claim 1, wherein the controller is configured or programmed so that in the range where the output value of the fuel gauge changes, the plurality of measurement reference points are set at equal intervals based on the output value of the fuel gauge.

3. The fuel management system according to claim 1, further comprising:
   a notifier to notify a user when the output value of the fuel gauge reaches a value lower than each of the plurality of measurement reference points by a predetermined value.

4. The fuel management system according to claim 1, further comprising:
   a display to display a prediction time until the output value of the fuel gauge reaches each of the plurality of measurement reference points.

5. The fuel management system according to claim 1, wherein, after the output value of the fuel gauge reaches 100%, even when there is a free capacity in the fuel tank and the fuel is further supplied to the fuel tank, the controller is configured or programmed to obtain the calibration data based on the amount of fuel supplied when the output value of the fuel gauge reaches 100%.

6. The fuel management system according to claim 1, wherein, when a first remaining amount of the fuel in the fuel tank calculated based on the calibration data deviates from a second remaining amount of the fuel in the fuel tank calculated based on an amount of the fuel supplied from the fuel tank to an engine of the marine vessel by a predetermined value or more, the controller is configured or programmed to judge that the calibration data is abnormal.

7. The fuel management system according to claim 6, wherein, when the first remaining amount deviates from the second remaining amount by about 10% or more, the controller is configured or programmed to judge that the calibration data showing a relationship between the output value of the fuel gauge and a remaining amount of the fuel in the fuel tank is abnormal.

8. The fuel management system according to claim 6, wherein the second remaining amount is a value obtained by subtracting an integrated value of the fuel injected by a fuel injector to supply the fuel to the engine from a total capacity of the fuel tank.

9. The fuel management system according to claim 6, wherein, the controller is configured or programmed to judge whether or not the first remaining amount deviates from the second remaining amount by the predetermined value or more after the first remaining amount starts to change.

10. The fuel management system according to claim 6, wherein, when a total capacity of the fuel tank is not completely filled with the fuel and the controller judges whether or not the first remaining amount deviates from the second remaining amount by the predetermined value or more, the controller is configured or programmed to set the second remaining amount, at a time of starting the judging, to the same value as the first remaining amount.

11. The fuel management system according to claim 6, further comprising:
   a notifier to notify an error when the calibration data is judged as abnormal.

12. The fuel management system according to claim 6, wherein
   the fuel gauge includes a float to measure the liquid level position of the fuel in the fuel tank; and
   when the output value of the fuel gauge is a value corresponding to a height within a movable range of the float, and the first remaining amount does not change even if the second remaining amount changes, the controller is configured or programmed to judge that the float is sticking.

13. The fuel management system according to claim 6, wherein
   the fuel gauge includes a float to measure the liquid level position of the fuel in the fuel tank; and
   when the output value of the fuel gauge is a value corresponding to a height within a movable range of the float and it is judged that the marine vessel is accelerating or decelerating or the hull is shaking and the first remaining amount does not change, the controller is configured or programmed to judge that the float is sticking.

14. The fuel management system according to claim 6, wherein
   when it is judged that a liquid level of the fuel in the fuel tank is not shaking, the controller is configured or programmed to judge whether or not the calibration data is abnormal by comparing the first remaining amount and the second remaining amount.

15. The fuel management system according to claim 6, wherein
   when it is judged that the calibration data is abnormal, the controller is configured or programmed to reobtain calibration data that shows a relationship between the output value of the fuel gauge and a remaining amount of the fuel in the fuel tank by using the output value of the fuel gauge and the amount of the fuel supplied to the engine of the marine vessel.

16. The fuel management system according to claim 6, wherein
   when a shift position of the marine vessel is neutral and the first remaining amount increases, the controller is configured or programmed to redo a comparison between the first remaining amount and the second remaining amount.

17. The fuel management system according to claim 6, wherein
   when the second remaining amount does not change and the first remaining amount increases, the controller is configured or programmed to redo a comparison between the first remaining amount and the second remaining amount.

\* \* \* \* \*